United States Patent [19]

Organek et al.

[11] Patent Number: 5,802,915
[45] Date of Patent: Sep. 8, 1998

[54] TRANSMISSION SHIFTING MECHANISM WITH BALL RAMP ACTUATOR

[75] Inventors: Gregory J. Organek, Detroit; David M. Preston, Clarkston, both of Mich.

[73] Assignee: Eaton Corporation, Cleveland, Ohio

[21] Appl. No.: 652,741

[22] Filed: May 23, 1996

[51] Int. Cl.⁶ .................................................. F16H 59/04
[52] U.S. Cl. ........................... 74/331; 74/375; 192/35; 192/40; 192/53.2; 192/69.91; 192/84.7; 192/84.92
[58] Field of Search ................................ 192/35, 40, 53.2, 192/69.91, 84.7, 84.92, 84.21, 54.52, 54.5; 74/331, 332, 375

[56] References Cited

U.S. PATENT DOCUMENTS

| | | | |
|---|---|---|---|
| 2,861,665 | 11/1958 | Passler | 192/54.5 X |
| 2,933,171 | 4/1960 | Kraeplin | 192/84.7 |
| 3,265,173 | 8/1966 | Russell | 192/69.91 |
| 4,022,308 | 5/1977 | Hurst | 192/54.5 X |
| 4,561,520 | 12/1985 | Fogelberg | 192/53.2 X |
| 4,869,354 | 9/1989 | Brazier | 192/84.92 X |
| 4,964,313 | 10/1990 | Davis | 74/331 |
| 5,368,145 | 11/1994 | Davis | 74/332 X |
| 5,460,060 | 10/1995 | Nellums | 74/375 X |
| 5,584,776 | 12/1996 | Weilant et al. | 192/35 X |

*Primary Examiner*—Rodney H. Bonck
*Attorney, Agent, or Firm*—Loren H. Uthoff, Jr.; Howard D. Gordon

[57] ABSTRACT

A transmission shifting system for axially displacing a jaw clutch having a plurality of axially and/or radially beveled teeth for engagement with a plurality of engagement cavities formed in a mainshaft gear where a ball ramp actuator or a cam ramp mechanism is used to axially displace the jaw clutch. An electrical coil is used to electromagnetically couple a control ring to the mainshaft gear using a clutch plate and an actuation ring is nonrotatably connected to the mainshaft. In an alternative embodiment, the actuation ring is formed as part of the jaw clutch and the control ring remains stationary relative to a mainshaft. A plurality of flux grooves are utilized to channel magnetic forces between the clutch plate and the mainshaft gear.

8 Claims, 6 Drawing Sheets

FIG 10 ions TRANSMISSION SHIFTING MECHANISM
WITH BALL RAMP ACTUATOR

BACKGROUND OF THE INVENTION

1. Field of the Invention

The present invention relates to a shifting mechanism for a gear change transmission, and more specifically, to a shifting mechanism for a gear change transmission where a beveled jaw clutch is moved by a ball ramp actuator into contact with engagement cavities formed in a mainshaft gear.

2. Description of the Prior Art

Gear change transmissions utilizing shift bar housing assemblies wherein one or more axially movable shift bars (also known as shift rails) and shift rods, each carrying an associated shift fork, are selectively axially moved to engage or disengage a selected transmission gear by axial movement of a clutch member, or of a gear having clutch teeth or jaw clutch, are well known in the prior art as may be seen in reference to U.S. Pat. Nos. 3,105,395; 3,283,613; 3,611,483; 4,152,949; 4,194,410; 4,445,393; 4,754,665; 4,876,924 and 5,053,961, the disclosures of which are hereby incorporated by reference.

Electronically controlled shift bar housing assemblies powered by pressurized hydraulic fluid, pressurized air, or electric motors and the controls therefore, are also well known in the prior art, as may be seen in reference to U.S. Pat. Nos. 4,428,248; 4,445,393; 4,722,237 and 4,873,881, all assigned to the same assignee as this invention and all hereby incorporated by reference.

While prior art electronically controlled actuated shift bar housing assemblies are generally satisfactory and are presently utilized in production applications for remotely controlled and/or automatically controlled gear change transmissions, the prior art assemblies are not totally satisfactory as they are complicated, expensive to produce, install and service. Prior art pneumatic systems are slow and difficult to control due to the compressibility of the air used to power the shift rails. The use of hydraulic fluid, as an operating medium, has proved to be difficult due to leaks in the system which results in degraded performance and requires extensive maintenance.

It is known to automate a traditional manual gearbox (transmission) by electronically controlling a plurality of actuators to move the transmission gear shift mechanism in coordination with a fully or partially automated driveline master clutch. The actuators move the transmission shifting rails holding the shift forks which in turn control the axial movement of one jaw clutch at the end of each shift fork. The jaw clutch axially slides along a splined transmission mainshaft to engage gearing and nonrotatably couples the input to the output of the transmission. Similar mechanical transmissions are well known in the prior art and may be appreciated by reference to U.S. Pat. Nos. 3,105,395; 3,283,613; 4,754,665; 4,876,924 and 5,053,961, the disclosures of which are hereby incorporated by reference.

It is also known to use ball ramp actuators powered by a separate drive motor for each pair of ball ramp actuators in a transmission to load clutch packs on the mainshaft to frictionally transfer rotary motion from the mainshaft to gears riding on the mainshaft which are meshed with gears on a parallel countershaft. U.S. Pat. No. 5,078,249, the disclosure of which is hereby incorporated by reference, describes such a gearbox. The ball ramp units consist of two pressure rings and an adjusting ring disposed therebetween. Both the pressure and adjusting rings use opposed pairs of variable depth grooves to capture a rolling member for axially expanding and contracting the pressure ring dependent on the rotational direction of the adjusting ring relative to the pressure ring. The rotary motion of the adjusting ring is supplied by a motor that is reacted against the transmission case.

The use of an electric motor actuator to rotate the adjusting ring relative to the transmission case results in complication and expense associated with certain mechanical and electrical components. The gearing required to transfer the relatively high speed rotary motion of a motor to the low travel rotary motion of the adjusting gear creates much of the complication. The gear reduction slows the speed of response of the ball ramp actuator thereby slowing the speed that the transmission can be executed.

SUMMARY OF THE INVENTION

In accordance with the present invention, the drawbacks of the prior art are overcome or minimized through the use of the relative rotation of the countershaft and the rotary mainshaft in combination with an electromagnetic coil assembly to energize a ball ramp clutch which axially displaces a beveled jaw clutch to couple a transmission mainshaft gear to a transmission mainshaft. In this manner, a simple electromagnetic coil assembly can be used to control the engagement of the ball ramp actuator to move the jaw clutch of the present invention without the complication of a motor or other rotary actuator which has to use a gear driven adjusting ring with its attendant slow response and mechanical complication. The beveled shape of a portion of the jaw clutch engages the mainshaft gear in a manner which allows the ball ramp actuator to continue to force the jaw clutch towards the mainshaft gear.

The above is accomplished by selectively electromagnetically coupling a ball ramp control ring to a transmission mainshaft gear through a clutch plate where an electrical coil is used to introduce a magnetic field in the clutch plate which in turn is nonrotatably coupled to the control ring. The control ring axially contacts and moves the jaw clutch which is nonrotatably connected to the mainshaft on splines which allow for axial movement of the jaw clutch in response to the ball ramp mechanism. Thus, in the preferred embodiment, the control ring is selectively magnetically coupled to the mainshaft gear which is continuously driven by the countershaft through a countershaft gear which meshes with the mainshaft gear. Relative rotation between the control ring and an actuation ring, which is mounted to the mainshaft, causes the ball ramp actuator to axially expand thereby moving the jaw clutch into engagement with the mainshaft gear to couple the mainshaft gear to the mainshaft for output to the vehicle driveline. The control ring comprises a first side of the ball ramp mechanism where the second side is comprised of the actuation ring. The control ring is axially moved by operation of rolling elements which engage variable depth corresponding grooves formed in both the control and actuation rings. With relative rotational movement of the control ring relative to the actuation ring, the ball ramp mechanism axially expands as the rolling elements transverse the variable depth grooves formed both in the control ring and the actuation rings. Beveled edges are formed on the jaw clutches where the jaw clutches contact corresponding engagement cavities formed in the mainshaft gear. The beveled contact surfaces of the jaw clutch and the mainshaft gear provide for bottoming of beveled teeth in cavities which allow continued force from the ball ramp actuator to further engage the jaw clutch with the mainshaft gear. Thus, as the jaw clutch engages the mainshaft gear the geometry of the beveled jaw clutch and the engagement cavities formed in the mainshaft gear allow further relative rotational movement between the control ring and the actuation ring thereby causing the ball ramp actuator to continue to axially expand to increase the level of engagement between the jaw clutch and the mainshaft gear. Magnetic flux grooves formed in the clutch plate prevent the travel of flux through the clutch plate so that the clutch plate is magnetically attracted only to the mainshaft gear and not the coil assembly.

In a first alternate embodiment, a coil assembly is used to electromagnetically link the clutch plate and control ring to the transmission mainshaft gear thereby providing for relative rotation between the control ring and the actuation ring. The actuation ring is connected to the transmission housing. The coil assembly is adapted to encircle the ball ramp mechanism and induces an electromagnetic field directly into the clutch plate which is magnetically attracted to and frictionally engages the mainshaft gear. A cam ramp mechanism can be used in place of a ball ramp mechanism to generate the required axial force to engage the jaw clutch of the present invention with the mainshaft gear.

A second alternate embodiment discloses an actuation ring which is formed as one piece with the jaw clutch. A control ring extends to nonrotationally connect the control ring to a clutch plate where the clutch plate is electromagnetically rotatably joined to a mainshaft gear. Relative motion between the mainshaft gear and the mainshaft energizes the ball ramp mechanism.

One provision of the present invention is to provide control of a ball ramp actuator connected to a jaw clutch in a transmission shifting system using an electrical coil.

Another provision of the present invention is to provide a compact ball ramp actuation system to control the axial movement of a jaw clutch in a gear change transmission.

Another provision of the present invention is to provide control of the ball ramp actuator to load a jaw clutch using an electrical coil to induce an electromagnetic field in a clutch plate which is nonrotatably connected to the control ring of a ball ramp actuator.

Another provision of the present invention is to provide a compact ball ramp actuation system to control the axial movement of a jaw clutch having beveled surfaces which engage engagement cavities formed in the mainshaft gear of a gear change transmission.

Still another provision of the present invention is to provide a compact ball ramp actuation system to control the axial movement of a jaw clutch having beveled surfaces which engage engagement cavities formed on the mainshaft gear to allow further actuation of the ball ramp actuator until the beveled surfaces fully engage the engagement cavities in a gear change transmission.

Although the present invention is described in relation to use in a twin countershaft type transmission, any type of suitable gearbox could make use of the present invention to couple a gear to a rotating shaft.

DETAILED DESCRIPTION OF THE PREFERRED EMBODIMENT

Certain terminology will be used in the following description for convenience in reference only and will not be limiting. For example, the terms "forward" and "rearward" will refer to directions forward and rearward of the transmission as normally mounted in a vehicle. The terms "rightward" and "leftward" will refer to directions in the drawings in connection with which the terminology is used. The terms "inwardly" and "outwardly" will refer to directions toward and away from respectively, the geometric center of the apparatus. The terms "upward" and "downward" will refer to directions as taken in the drawings in connection with which the terminology is used. All foregoing terms mentioned above include the normal derivatives and equivalents thereof.

For purposes of promoting the understanding of the principles of the invention, reference will now be made to the embodiment illustrated in the drawings and specific language will be used to describe the same. It will nevertheless be understood that no limitation on the scope of the invention is thereby intended, such alterations and further modifications in the illustrated device, and such further applications of the principles of the invention as illustrated therein being contemplated as would normally occur to one skilled in the art to which the invention relates.

Figure 1:
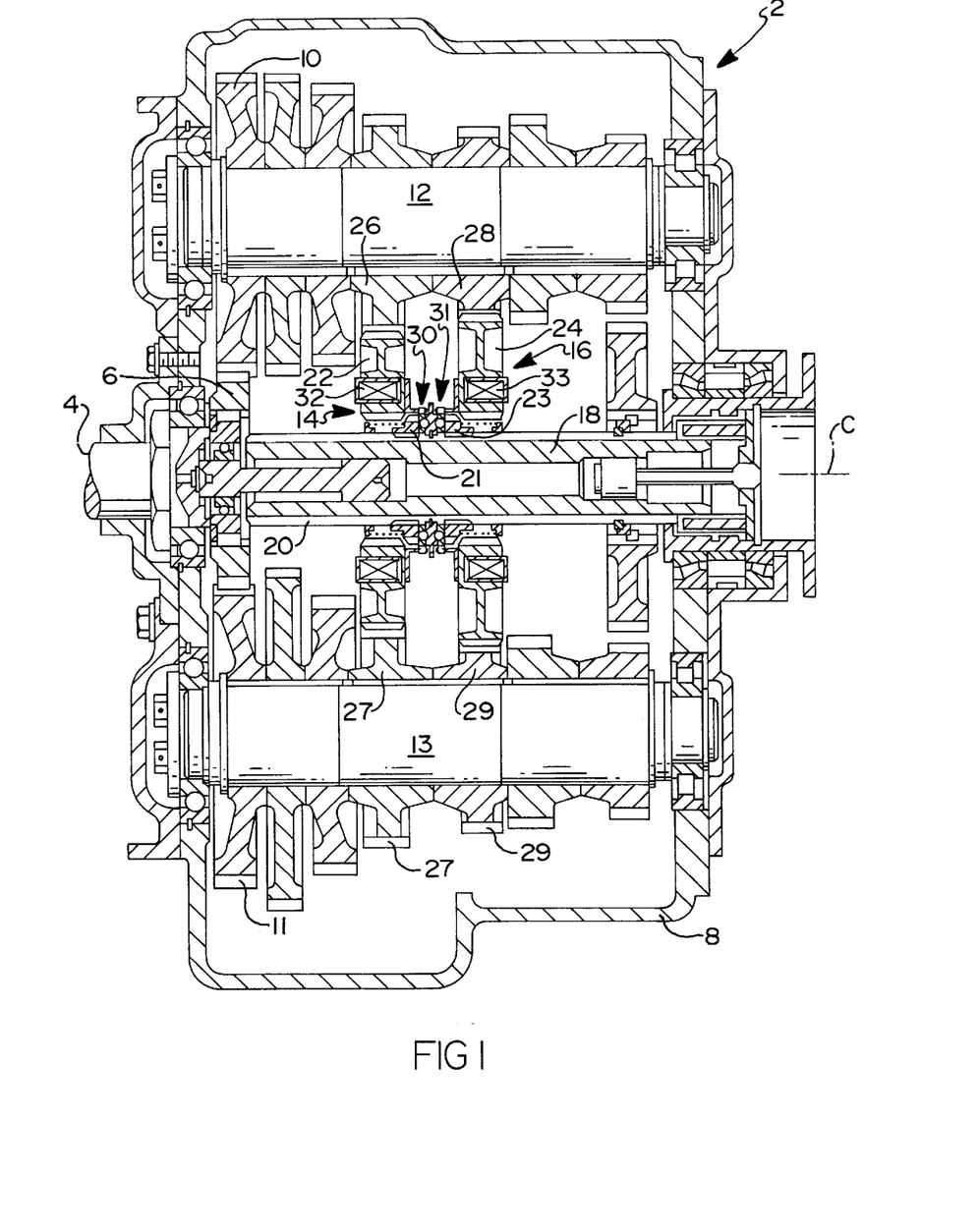
FIG. 1 is a partial cross-sectional view of a transmission having a shifting system according to the present invention.

A change gear transmission 2 which utilizes the ball ramp actuators 14 and 16 of the present invention may be seen by reference to FIG. 1. FIG. 1 illustrates a partial cross-sectional view of a transmission 2 having an input shaft 4 connected to a drive gear 6 both supported in a transmission housing 8. The drive gear 6 engages both countershaft drive gears 10 and 11 which are nonrotatably connected to the respective countershafts 12 and 13. Countershaft 12 rotates countershaft gears 26 and 28 and countershaft 13 rotates countershaft gears 27 and 29. Ball ramp actuator 14 and ball ramp actuator 16 are used to selectively couple respective mainshaft gears 22 and 24 to the mainshaft 18. The mainshaft gear 22 or the mainshaft gear 24 are nonrotatably coupled to the mainshaft 18 with respective jaw clutches 21 and 23. Not shown are the other mainshaft gears which are selectively rotatably linked to the mainshaft 18 through engagement of their respective ball ramp actuators (also not shown). As shown in FIG. 1, countershaft gears 26 and 27 and countershaft gears 28 and 29 are rotationally linked to the mainshaft 18 through activation and axial displacement of the respective ball ramp mechanisms 30 and 31, by energizing their respective electrical coil assemblies 32 and 33 through introduction of an electrical current into electrical leads 32A and 33A.

The illustrated transmission 2 comprises an input shaft 4 carrying a drive gear 6 which engages countershaft drive gears 10 and 11 for rotation therewith. Input shaft 4 is intended to be driven by a prime mover such as an engine (not shown) by means of a master clutch or torque converter (not shown), the use of which is well known in the art. A pair of substantially identical countershafts 12 and 13 are rotatably mounted in a housing 8 and rotated with the input shaft 4 through rotation of the countershaft drive gears 10 and 11. An output shaft or mainshaft 18 is provided which is preferably floatingly and/or pivotably mounted in the transmission housing 8 and is driven by the countershafts 12 and 13 which functionally split the load. Thus, the mainshaft 18 is not directly connected to the input shaft 4 but is driven by the countershafts 12 and 13 through a selected gear ratio. Each of the countershafts 12 and 13 carry a plurality of countershaft gears, including for example, countershaft gears 26 and 28 rotating with countershaft 12 and countershaft gears 27 and 29 rotating with countershaft 13, all of which are affixed thereto for rotation therewith. Countershaft gears 26 and 27 are constantly meshed with mainshaft gear 22 and countershaft gears 28 and 29 are constantly meshed with mainshaft gear 24. Any number of gear pairs could be used to provide the desired number of drive gear ratios in a similar theory of operation to be utilized to transfer power to the mainshaft 18 from the countershafts 12 and 13.

The mainshaft gears 22 and 24, for example, are not rotationally affixed to the mainshaft 18 and do not normally drive the mainshaft 18 unless rotationally coupled to the mainshaft 18 with some type of device such as jaw clutches which are moved using operator controlled shift forks through a lever controlled shift linkage, a technique which is known in the prior art. According to the present invention, ball ramp actuators 14 and 16 are used to move the improved jaw clutches 21 and 23 into engagement with the selected mainshaft gear such as mainshaft gear 22 or mainshaft gear 24 to provide for rotational coupling between the input shaft 4 and the countershafts 12 and 13 and the mainshaft 18. Although not shown in FIG. 1, other pairs of countershaft gears and their respective mainshaft gears are in constant mesh and can be similarly coupled to the mainshaft 18 through electrical excitation of their respective coil assembly.

The mainshaft gears 22 and 24 are rotatably supported and axially affixed on the mainshaft 18. According to the present invention, the mainshaft gears 22 and 24 coupled to the mainshaft 18 using jaw clutches 21 and 23 which are independently axially displaced to engage their respective mainshaft gears 22 or 24 upon activation of either ball ramp actuator 14 or ball ramp actuator 16 according to what gear ratio is desired. The ball ramp actuator 14 is energized upon the introduction of an electrical current into electrical leads 32A which energize the electrical coil assembly 32 thereby activating the ball ramp mechanism 30 contained in the ball ramp actuator 14. In a similar manner, by introduction of electrical current into electrical leads 33A, which are joined to electrical coil assembly 33, an electromagnetic field is produced which activates the ball ramp mechanism 31 contained in the ball ramp actuator 16.

Typically, only one electric coil assembly 32 or 33 is energized at one time since only one gear set should be engaged. For example, when the speed ratio determined by gearset countershaft gears 26 and 27 and mainshaft gear 22 is desired, coil assembly 32 is energized. The electromagnetic field generated by the coil assembly 32 introduces an electromagnetic force into the ball ramp actuator 14 which activates the ball ramp mechanism 30 which axially expands to move the jaw clutch 21 into engagement with the mainshaft gear 22. Since the jaw clutch 21 has splines which extend radially inward to rotationally affix the jaw clutch 21 to splines 20 formed on the mainshaft 18, upon engagement of the jaw clutch 21 with the mainshaft gear 22, the mainshaft gear 22 is nonrotatably linked to the mainshaft 18 resulting in a rotational coupling of the mainshaft 18 to both countershafts 12 and 13 through countershaft gears 26 and 27. In a similar manner, coil assembly 33 could be energized resulting in activation of the ball ramp mechanism 31 thereby imparting an axial displacement of the jaw clutch 23 which then contacts and engages the mainshaft gear 24. The mainshaft 24 is then rotationally coupled to the mainshaft 18 and thus, the mainshaft 18 is rotationally coupled to the countershaft 12 and 13 through the countershaft gears 28 and 29.

The power flows rearward through the transmission 2 to the rest of the vehicle driveline. Specifically, the rotational energy flows through the input shaft 4 through the drive gear 6 which meshes outwardly with the countershaft drive gears 10 and 11. The countershafts 12 and 13 rotate the countershaft gears 26, 27, 28 and 29. Depending on which coil 32 or 33 is energized, the rotation of the countershafts 12 and 13 are transferred to the mainshaft 18 through either gearset countershaft pairs 26 and 27 and into mainshaft 22 or countershaft gears 28 and 29 into mainshaft gear 24. Preferably, as is known in the art, mainshaft gears 22 and 24 are somewhat radially movable (floating) relative to the mainshaft 18. The advantages of utilizing a floating mainshaft and/or floating mainshaft gears is well known in the art and may be appreciated in greater detail by reference to the aforementioned U.S. Pat. No. 3,105,395.

Figure 2:
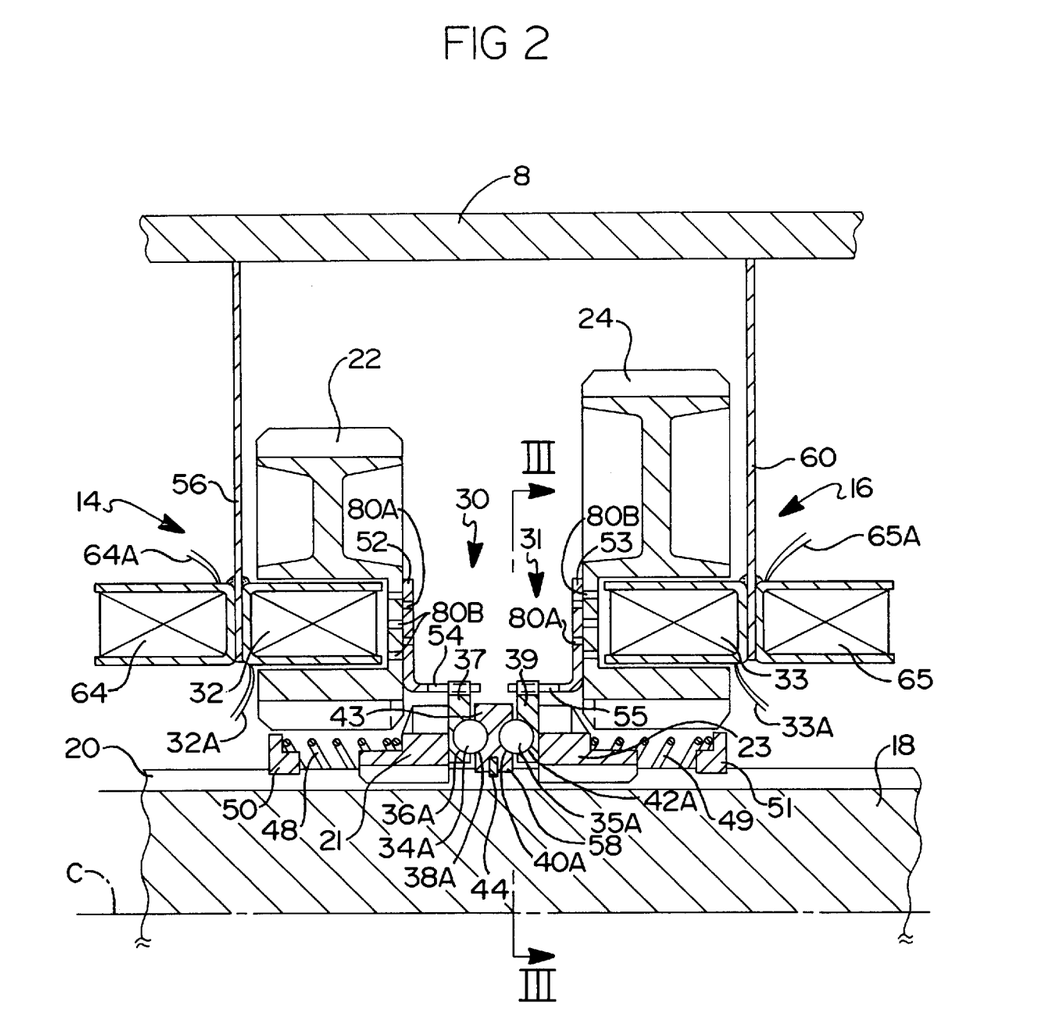
FIG. 2 is a cross-sectional view of two ball ramp actuators and respective jaw clutches of the present invention installed with respective mainshaft gears in a transmission.

Now referring to FIG. 2, a partial cross-sectional view of two ball ramp actuators 14 and 16 of the present invention as installed on respective mainshaft gears 22 and 24 in transmission 2 is shown. Both ball ramp mechanisms 30 and 31 use a plurality of rolling elements 34A and 35A respectively, operating in grooves 36A and 38A formed in the control ring 37 and the control ring 39 with substantially identical circumferential grooves 40A and 42A formed in the actuation ring 43. The actuation ring 43 is held in position relative to the mainshaft 18 by stabilization ring 44 which engages a groove cut into the mainshaft 18. The actuation ring 43 is nonrotatably connected to mainshaft 18 through spline 58. The jaw clutch 21 is biased away from the mainshaft gear 22 by a return spring 48 and in a similar fashion, jaw clutch 23 is biased away from mainshaft gear 24 by return spring 49 where both return springs 48 and 49 are held in position and in a state of compression by their respective spring stops 50 and 51 which are held in place on the mainshaft 18. Annular clutch plates 52 and 53 operate in proximity to their respective mainshaft gears 22 and 24 such that when coil assembly 32 or 33 is energized, the clutch plate 52 or clutch plate 53 are electromagnetically attracted to mainshaft gear 22 or mainshaft gear 24 thereby frictionally coupling the clutch plate 52 or clutch plate 53 to their respective mainshaft gear 22 or 24. The clutch plates 52 and 53 have respective plate fingers 54 and 55 which engage their respective control rings 37 and 39 in a manner to allow axial movement of the clutch plates 52 and 53 relative to the mainshaft gears 22 and 24 while rotationally linking the clutch plates 52 and 53 to their respective control rings 37 and 39. For example, relative rotation between the mainshaft gear 22 and the mainshaft 18 causes relative rotation between the actuation ring 43 and the control ring 39 thereby causing the ball ramp mechanism 31 to axially expand thereby moving the jaw clutch 23 into engagement with the mainshaft gear 24.

In FIG. 2, electrical coils 32 and a second coil assembly 64 having electrical leads 64A are structurally connected to the housing 8 by coil support 56. The additional coil assemblies 64 and 65 illustrate an arrangement whereby two coil assemblies are mounted to the transmission housing 8 using one coil support 56. Coil assembly 64 can be used to provide control of a third ball ramp actuator (not shown) to engage another mainshaft gear (also not shown). Coil assembly 33 is attached to the housing 8 by coil support 60 which also supports in a similar fashion a coil assembly 65 having electrical leads 65A for activation of a fourth ball ramp actuator (not shown) for control of the engagement of its own associated mainshaft gear. Thus, depending on the gear ratio desired, electrical coils 32 or 33 or 64 or 65 can be electrically energized through electrical leads 32A, 33A, 64A or 65A thereby activating the associated ball ramp actuators 30, 31, or the two ball ramp actuators not shown in FIG. 2, thereby causing the jaw clutch 21 or 23 or one of two other jaw clutches not shown in FIG. 2, to be moved into engagement of mainshaft gears 22 or 24 or to mainshaft gears not shown in FIG. 2, one at a time to engage the desired mainshaft gear to the mainshaft 18. All of the mainshaft gears are continuously driven by their associated countershaft gears such as mainshaft gear 22 is continuously rotated and meshes with countershaft gears 26 and 27 and in an identical fashion mainshaft gear 24 is rotated and engages countershaft gears 28 and 29. Segmented flux grooves 80A are formed in the clutch plates 52 and 53 and segmented flux grooves 80B are formed in the mainshaft gears 22 and 24 which together act to intensify the electromagnetic forces generated by the coil assemblies 32 and 33 to more effectively attract the clutch plates 52 and 53 to their respective mainshaft gears 22 and 24. This technique is known in the art and used for vehicle air conditioning compressor clutches.

Figure 3:
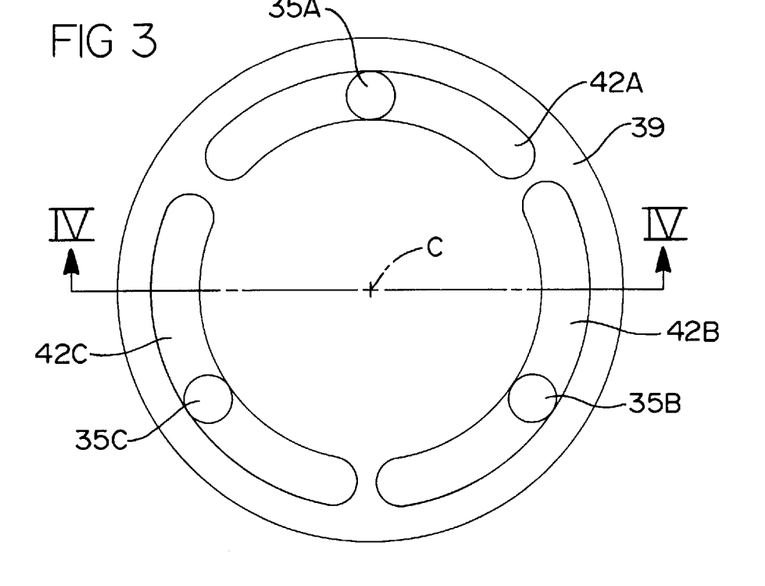
FIG. 3 is an axial cross-sectional view of the ball ramp mechanism of the present invention taken along line III—III of FIG. 2.
Figure 4:
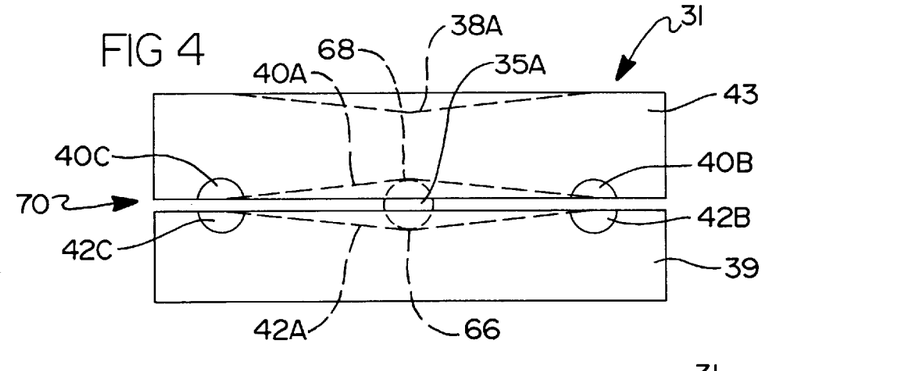
FIG. 4 is a cross-sectional view of the ball ramp mechanism of the present invention taken along line IV—IV of FIG. 3 at minimum separation.
Figure 5:
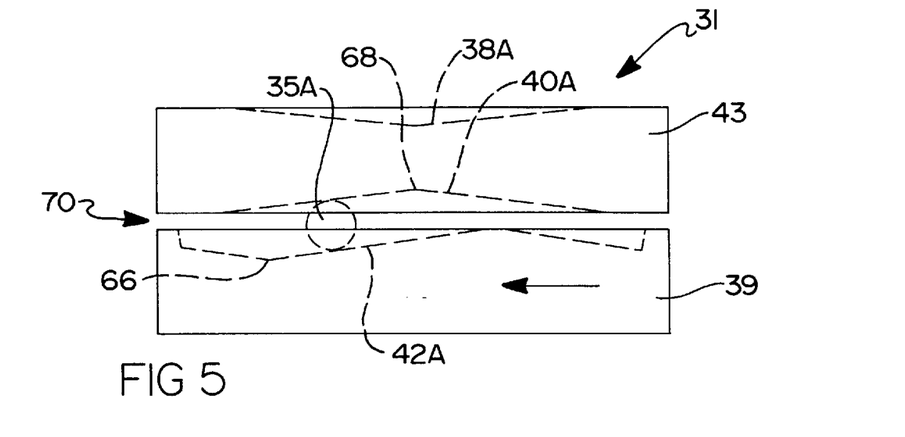
FIG. 5 is a cross-sectional view of the ball ramp mechanism of the present invention taken along line IV—IV of FIG. 3 with increased separation.

Referring now to FIGS. 3, 4 and 5 to describe the operation of the ball ramp mechanism 31, a cross-sectional view of the control ring 39 taken along line III—III of FIG. 2 is shown in FIG. 3 and a view taken along line IV—IV of FIG. 3 of the control ring 39 and the actuation ring 43 separated by a rolling element 35A are shown in FIGS. 4 and 5. Three spherical rolling elements 35A, 35B and 35C are spaced approximately 120 degrees apart rolling in three variable depth grooves 42A, 42B and 42C, respectively, as the control ring 39 is rotated relative to the actuation ring 43. Any number of spherical rolling elements and respective ramps could be utilized depending on the desired angle of rotation and axial motion of the ball ramp actuator 16. It is desirable to employ at least three spherical rolling elements 35A, 35B and 35C traveling on a like number of identically and equally spaced opposed variable depth grooves 40A and 42A, 40B and 42B, and 40C and 42C formed in the control ring 39 and the actuation ring 43 respectively to provide stability to the control ring 39 and the actuation ring 43. Any type of low friction device which would roll along the grooves 42A, 42B, 42C could be utilized for the rolling elements 35A, 35B and 35C such as balls or rollers.

Three semi-circular, circumferential variable depth grooves 42A, 42B and 42C are formed in the face of the control ring 39 with corresponding identical opposed variable depth grooves 40A, 40B and 40C (when grooves 40B and 40C are not shown) are formed in the face of the actuation ring 43 as shown in FIGS. 4 and 5. Also, formed in an opposite face of actuation ring 31 are grooves 38A, 38B and 38C where 38B and 38C are not shown but are substantially identical to grooves 42B and 42C. The variable depth grooves 40A, 40B, 40C, 42A, 42B, and 42C vary in axial depth according to circumferential position in the groove and circumferentially extend for approximately 120 degrees (actually slightly less than 120 degrees to allow for a separation section between the ramps). Any number of opposed grooves and associated rolling elements could be utilized depending on the desired range of rotation and needed axial travel of the ball ramp mechanism 31. The groove depth is at a maximum at the center of its span. The control ring 39 and the actuation ring 43 can be made of a high strength steel or powdered metal with the variable depth grooves 38A, 38B, 38C, 40A, 40B, 40C and 42A, 42B and 42C carburized and hardened to $R_C$ 55–60. The axial separation 70, shown at a minimum in FIG. 4, between the control ring 39 and the actuation ring 43 is determined by the rotational orientation between the corresponding opposed grooves such as 40A and 42A where the spherical rolling element 35A rolls on each ramp 40A and 42A as the control ring 39 is rotated relative to the actuation ring 43 on the same axis of rotation C. The relative rotation forces the control ring 39 and the actuation ring 43 apart or allows them to come closer together as determined by the position of the rolling elements 35A, 35B and 35C in their respective groove pairs 40A, 42A and 40B, 42B and 40C, 42C thereby providing for axial movement of the jaw clutch 23 for engagement with the mainshaft gear 24. Note that the grooves are dual ramped with their deepest point at their center, which provides for an increase in axial separation 70 as the control ring 39 is rotated in either direction from a starting point as shown in FIG. 4. This dual action capability provides for lock-up of the mainshaft gear 24 in both drive and coast modes of vehicle operation.

FIG. 4 illustrates the rotational orientation of the control ring 39 and the actuation ring 43 when the axial separation distance 70 is at a minimum, since the grooves 40A and 42A are directly opposed and the rolling element 35A is in the deepest section of the grooves 40A and 42A as indicated by the alignment of reference points 66 and 68. Rotation of the control ring 39 in either direction would result in increased axial separation distance 70.

FIG. 5 illustrates the increased separation distance 70 as the control ring 39 is rotated relative to the actuation ring 43. Reference points 66 and 68 are no longer opposite one another and the rolling element 35A has traversed both groove 42A in the control ring 39 and groove 40A in the actuation ring 43 thereby increasing the axial separation distance 70.

As illustrated in FIG. 2, the control ring 39 is rotated relative to the actuation ring 43 by application of a torque input created by the clutch plate 53 contacting the mainshaft gear 24 as electrical current is supplied to the coil assembly 33. The clutch plate 53 has plate fingers 55 which extend and rotationally connect the clutch plate 53 to the control ring 39 thereby rotationally locking the mainshaft gear 24 to the control ring 39. If there is relative rotational motion between the control ring 39 and an actuation ring 43, the clutch plate 53 applies a force to the control ring 39 causing it to rotate relative to the actuation ring 43 to, for example, the position shown in FIG. 5. Reference point 66 in relation to reference to point 68 on grooves 42A and 40A respectively shown aligned in FIG. 4 are displaced to the positions shown in FIG. 5 where the separation distance 70 is increased due to the rolling of the rolling element 35A in relation to the grooves 40A and 42A. Thus, the relative motion between the control ring 39 and the actuation ring 43 as the rolling elements 35A, 35B and 35C assume new positions in their respective grooves 42A, 42B and 42C and 40A, 40B and 40C, increases the axial separation between the control ring 39 and the actuation ring 43. Increased axial separation 70 of the ball ramp mechanism 31 causes the jaw clutch 23 to be displaced axially towards the mainshaft gear 24 thereby engaging the mainshaft gear 24 and rotationally coupling the mainshaft gear 24 to the mainshaft 18. Since the mainshaft gear 24 is continuously meshed and rotated with countershaft gears 28 and 29, the mainshaft 18 is rotationally coupled to the input shaft 4 thereby completing the power flow through the transmission 2 and eventually to the vehicle driveshaft (not shown) for transfer to the rest of the vehicle driveline.

Figure 6:
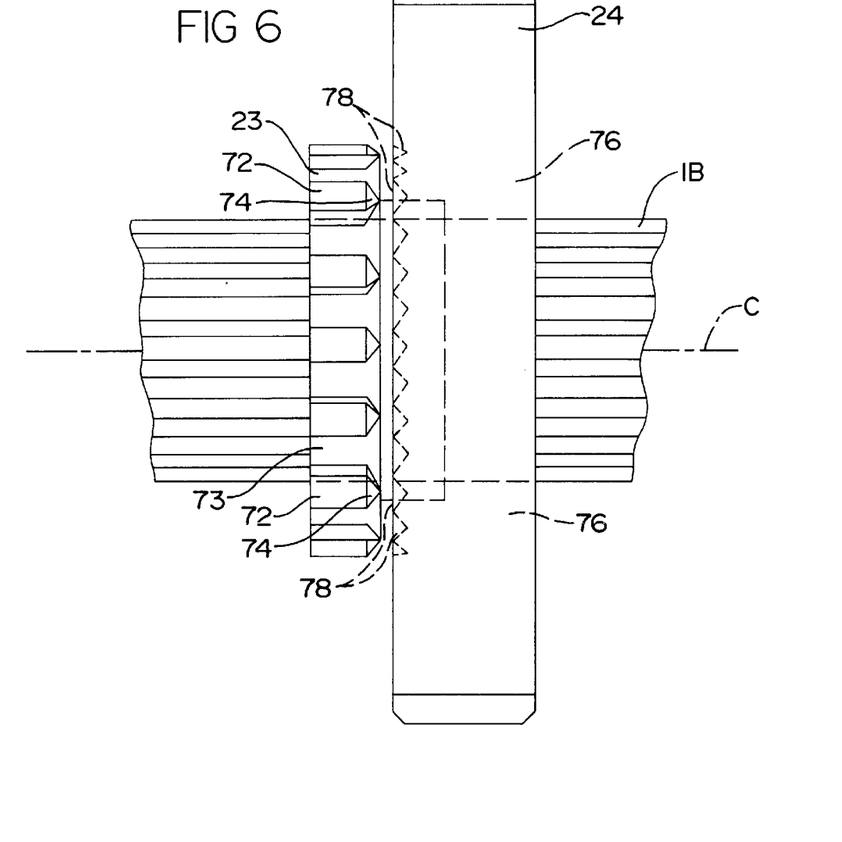
FIG. 6 is an elevational view of the jaw clutch and mainshaft gear of the present invention.

FIG. 6 is an elevational view of the jaw clutch 23 and the mainshaft gear 24 of the present invention. The jaw clutch 23 consists of a plurality of jaw clutch teeth 72 shown formed one main body 73 of the jaw clutch 23 and which are shown as equally spaced along the periphery of the jaw clutch 23. The jaw clutch teeth 74 are axially and radially beveled so as to engage matching clutch engagement cavities 78 formed in the mainshaft gear 24. The jaw clutch teeth 74 could also extend axially from one face of the annular jaw clutch 23 rather than being formed on the periphery. The design of the beveled jaw clutch teeth 74 and the engagement cavities 78 allow the control ring 39 to continue to rotate relative to the actuation ring 43 to further axially displace the jaw clutch 23 into the mainshaft gear 24 for increased engagement of the jaw clutch teeth 74 into the engagement cavities 78.

Figure 7:
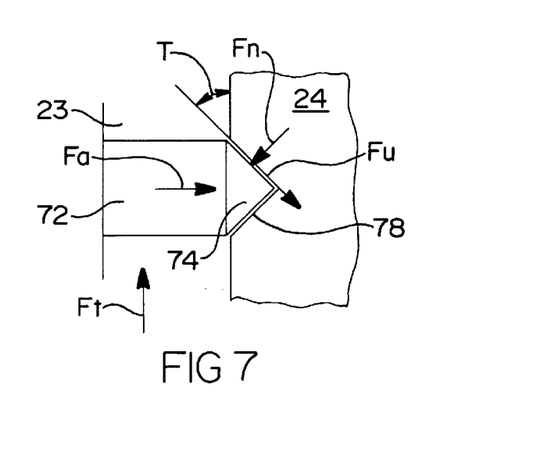
FIG. 7 is a schematic diagram of the forces generated between the jaw clutch and the mainshaft gear of the present invention.

Now referring to FIG. 7, a schematic of the jaw clutch 23 engaging the mainshaft gear 24 is shown where the clutch teeth 72 have engaged the mainshaft gear 24 at the jaw clutch teeth 74 engaging the clutch engagement cavity 78. Angle T is used to calculate the forces generated on the jaw clutch 23 where a force is created which tends to allow the ball ramp mechanism 31 to further activate thereby providing for increased axial force on the jaw clutch 23 that tends to further engage the jaw clutch teeth 74 in the clutch engagement cavities 78. The geometry of the jaw clutch teeth 74 does not permit the forces generated by the jaw clutch 23 to back drive the ball ramp mechanism 31.

The force $F_t$ is calculated by the equation:

$$F_t = F_n \sin T + u F_n \cos T$$

and $F_a$ is calculated by the equation:

$$F_a = F_n \cos T - u F_n \sin T$$

Therefore, Ft/Fa=tan (T+B) where B=$\tan^{-1}$ (u) where

Ft is the driving force applied by the jaw clutch 23

Fa is the axial force applied by the control ring 39 of the ball ramp mechanism 31

Fn is the normal force component

Fu is the tangential force component u is the coefficient of friction

T is the angle of the beveled jaw clutch tooth 74

B is the angle of friction

Figure 8:
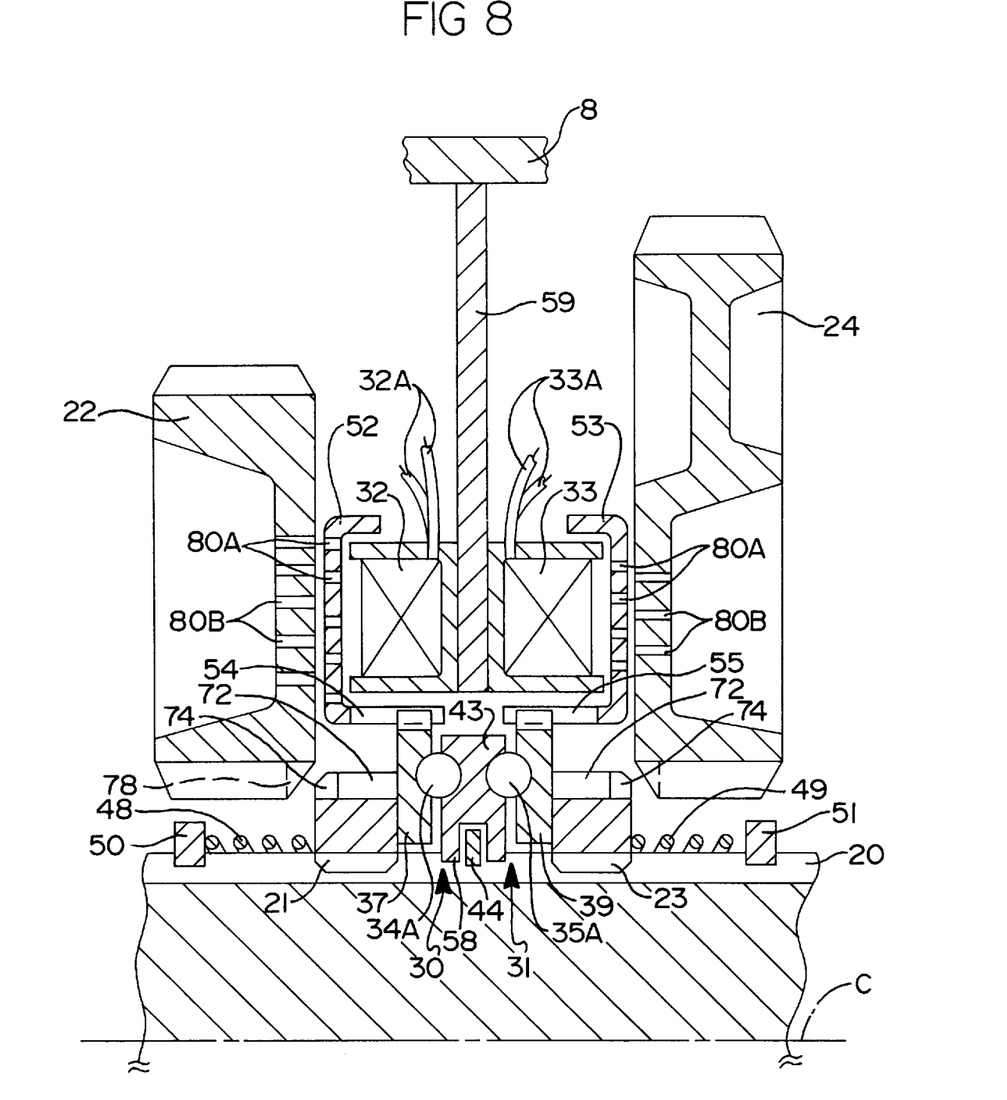
FIG. 8 is a partial cross-sectional view of a first alternate embodiment of the ball ramp actuator of the present invention.

FIG. 8 is a partial cross-sectional view of a first alternate embodiment of the transmission shifting system of the present invention. The configuration and orientation of the electrical coil assemblies 32 and 33 have been changed where the electrical coil assemblies 32 and 33 are mounted to the actuation ring support 59 and electromagnetically supply a force to attract clutch plates 52 and 53 to their respective mainshaft gears 22 and 24 thereby providing relative motion between the control ring 37 and the actuation ring 43 and the control ring 39 and the actuation ring 43.

Flux grooves 80A are formed as segmented circumferential grooves in the clutch plates 52 and 53 and flux grooves 80B are formed in the mainshaft gears 22 and 24 such that magnetic flux does not flow through the clutch plates 52 and 53 and instead flows through the mainshaft gears 22 and 24 thereby providing frictional connection between the clutch plate 52 and mainshaft gear 22 and clutch plate 53 and mainshaft gear 24. The flux grooves 80A and 80B are similar to those used in vehicle air conditioning clutches and prevent the clutch plates 52 and 53 from short circuiting the magnetic path when electrical current is applied. Thus, the geometry of the jaw clutch teeth 74 and the engagement cavities 78 allow the control ring 39 to continue to move relative to the actuation ring 43 until the jaw clutch teeth 74 fully engage the engagement cavities 78.

Figure 9:
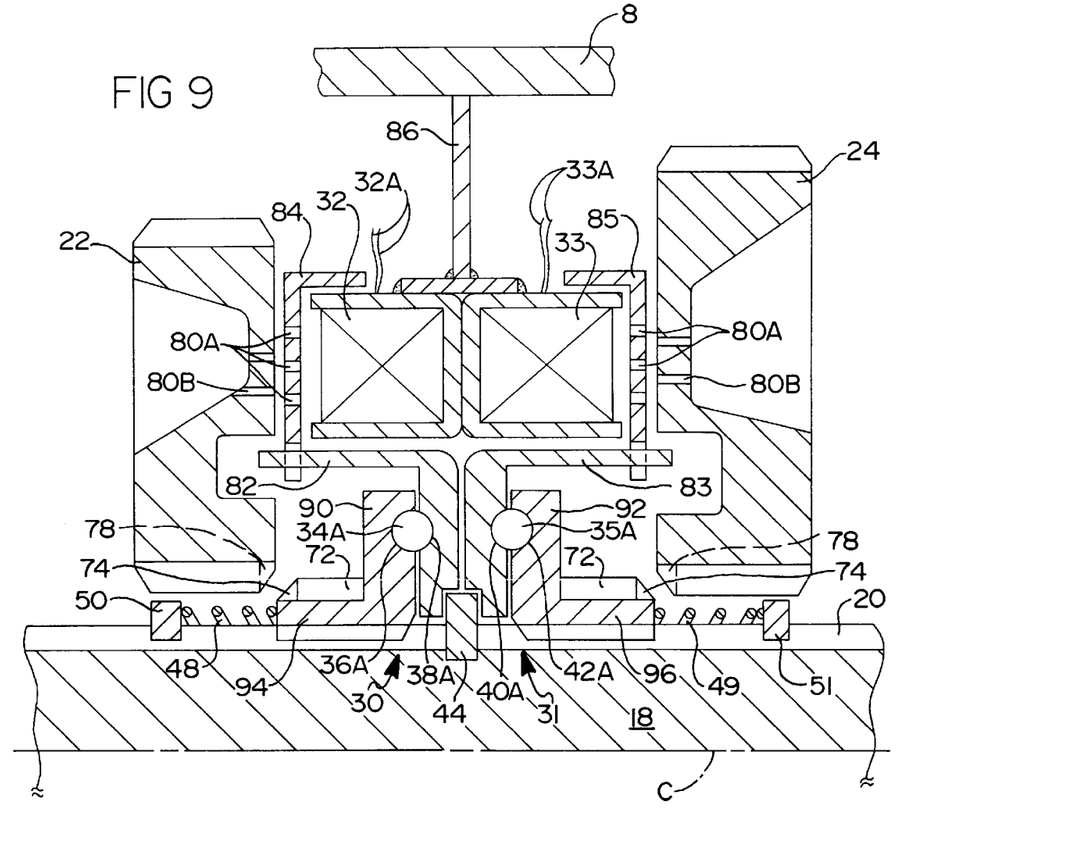
FIG. 9 is a partial cross-sectional view of a second alternate embodiment of the ball ramp actuator of the present invention.

Now referring to FIG. 9, a partial cross-sectional view of a second alternate embodiment of the transmission shifting system of the present invention is shown. Again as is shown in FIG. 8, the coil assemblies 32 and 33 are mounted to the housing 8 using a support member 86. The coil assemblies 32 and 33 electromagnetically connect the clutch plate 84 to the mainshaft gear 22 and in similar fashion coil assembly 33 electromagnetically connects causing the clutch plate 85 to contact and frictionally engage the mainshaft gear 24. The clutch plates 84 and 85 are nonrotationally linked to respective control rings 82 and 83. Thus, the control rings 82 and 83 in the second alternate embodiment of FIG. 9 are frictionally linked to the mainshaft gears 22 and 24. Rather than being separate parts as shown in previous embodiments, the jaw clutches 94 and 96 now extend and form actuation rings 90 and 92. The ball ramp mechanisms 30 and 31 operate in a similar fashion to the previous embodiments with the exception that the grooves 38A, 38B and 38C are formed in control ring 82 and grooves 40A, 40B and 40C are formed in control ring 83 and grooves 38A, 38B and 38C are formed in actuation ring 90 and grooves 42A, 42B and 42C are formed in actuation ring 92. Thus, with these changes, the operation is identical to that described in reference to FIGS. 3, 4 and 5. Again, relative motion is created when there is rotational speed difference between the selected mainshaft gears 22 or 24 and the mainshaft 20, where electrical energization of the coil assembly 32 results in frictional coupling between the clutch plate 84 and the mainshaft gear 22 which in turn rotationally drives the control ring 82 such that relative rotation of the control ring 82 and the actuation ring 90 and the jaw clutch 94 result in activation of the ball ramp mechanism 30 thereby causing the jaw clutch 94 to axially move towards the mainshaft gear 22 causing engagement of the jaw clutch teeth 74 with the engagement cavities 78. Upon cessation of the electrical energy to the coil assembly 32, the return spring 48 causes the jaw clutch 94 to axially move back to its original position thereby collapsing the ball ramp mechanism 30 to a state as shown in FIG. 4 where the separation distance 70 is at a minimum. The stabilization ring 44 maintains the geometry of the control ring 82 and the control ring 83 both relative to one another and relative to the mainshaft 18.

Figure 10:
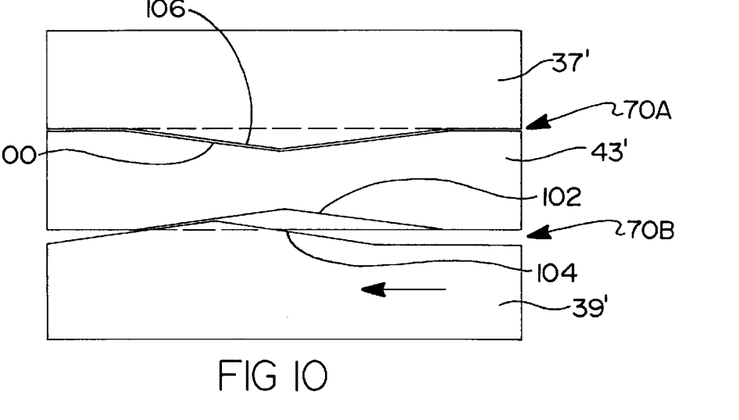
FIG. 10 is a cross-sectional view of a ramp actuator for use with the present invention.

Now referring to FIG. 10, a top elevational view of an alternate embodiment of the actuation ring 43' and the control ring 39' is shown which can be utilized with the shifting mechanisms shown in FIGS. 2 and 8. Since a relatively moderate force (approximately 300 pounds force) is required to force the jaw clutches 21 and 23 into engagement with their respective mainshaft gears 22 and 24, ball ramp mechanisms 30 and 31 are not necessarily needed to generate this level of force. As an alternate to the ball ramp mechanism 31, an actuation ring 43' and a control ring 39' having cam ramps 102 and 104 respectively can be used to generate the required axial force to engage the jaw clutch 23 with the mainshaft gear 24. In a similar manner, ball ramp mechanism 30 is replaced with control ring 37' operating against actuation ring 43'. FIG. 10 shows the control ring 37' in a nonactivated mode where the separation 70A is at a minimum and control ring 39' at an intermediate position relative to the actuation ring 43' where the cam ramp 104 has partially ridden up on cam ramp 102 thereby increasing the separation 70B which would also move the jaw clutch 23 into engagement with mainshaft gear 24. Thus, since by using the jaw clutch 23 of the present invention, an actuation ring 43' and a control ring 39' having cam ramps 102 and 104 respectively can generate the required force without using a ball ramp mechanism 31.

This invention has been described in great detail, sufficient to enable one skilled in the art to make and use the same. Various alterations and modifications of the invention will occur to those skilled in the art upon the reading and understanding of the foregoing specification, and it is intended to include all such alterations and modifications as part of the invention, insofar as they come within the scope of the intended claims.

We claim:

1. A transmission shift system for a transmission having a mainshaft and at least one countershaft disposed substantially within a housing having rotational axes parallel to one another; at least two pairs of gears, each pair comprising a countershaft gear nonrotatably attached to said countershaft permanently in mesh with a corresponding mainshaft gear rotatably supported on said mainshaft, said mainshaft gear supported on said mainshaft being connectable to said mainshaft by an axially moveable jaw clutch, the shift system comprising:

a ball ramp mechanism comprising an actuation ring nonrotatably connected to said mainshaft and a control ring disposed adjacent to said actuation ring, both encircling said mainshaft and having opposed faces provided with circumferentially extending grooves, arranged as at least three opposed pairs of grooves, including portions of varying depth, and rolling members disposed one in each opposed pair of grooves, said grooves on said actuation ring and said control ring being arranged so that relative angular movement of said actuation ring and said control ring in either direction, from a starting position thereof, causes axial movement of said control ring away from said actuation ring to axially displace said jaw clutch thereby rotatably coupling said mainshaft gear to said mainshaft;

a coil assembly mounted to said housing and electrically energized to create an electromagnetic field to frictionally couple said control ring to said mainshaft gear thereby causing relative rotation between said control ring and said actuation ring;

a clutch plate adapted to frictionally engage said coil assembly upon electrical energization of said coil assembly, said clutch plate being nonrotatably linked to said control ring;

where said jaw clutch axially contacts said control ring and has axially beveled clutch teeth formed thereon adapted to engage a corresponding plurality of axially beveled engagement cavities formed in said mainshaft gear.

2. The transmission shift system of claim 1, wherein said clutch plate has clutch plate fingers which axially extend to engage said control ring thereby allowing relative axial motion between said clutch plate and said control ring and nonrotationally coupling said clutch plate to said control ring.

3. The transmission shift system of claim 1, wherein said clutch plate is disposed on a first side of said mainshaft gear and said coil assembly is disposed on a second side of said mainshaft gear.

4. A transmission shift system for a transmission having a mainshaft and at least one countershaft disposed substantially within a housing having rotational axes parallel to one another; at least two pairs of gears, each pair comprising a countershaft gear nonrotatably attached to said countershaft permanently in mesh with a corresponding mainshaft gear rotatably supported on said mainshaft, said mainshaft gear supported on said mainshaft being connectable to said mainshaft by an axially moveable jaw clutch, the shift system comprising:

a cam ramp mechanism comprising an actuation ring nonrotatably connected to said mainshaft and a control ring disposed adjacent to said actuation ring, both encircling said mainshaft and having opposed faces provided with cam ramps arranged as at least three opposed pairs of cam ramps, including portions of varying depth, said cam ramps on said actuation ring and said control ring being arranged so that relative angular movement of said actuation ring and said control ring in either direction, from a starting position thereof, causes axial movement of said control ring away from said actuation ring to axially displace said jaw clutch thereby rotatably coupling said mainshaft gear to said mainshaft;

a coil assembly mounted to said housing and electrically energized to create an electromagnetic field to frictionally couple said control ring to said mainshaft gear thereby causing relative rotation between said control ring and said actuation ring;

a clutch plate adapted to frictionally engage said coil assembly upon electrical energization of said coil assembly, said clutch plate being nonrotatably linked to said control ring;

where said jaw clutch axially contacts said control ring and has axially beveled clutch teeth formed thereon adapted to engage a plurality of axially beveled engagement cavities formed in said mainshaft gear.

5. The transmission shift system of claim 4, wherein said clutch plate has clutch plate fingers which axially extend to engage said control ring thereby allowing relative axial motion between said clutch plate and said control ring and nonrotationally coupling said clutch plate to said control ring.

6. The transmission shift system of claim 4, wherein said control ring axially extends to rotationally engage said clutch plate.

7. The transmission shift system of claim 4, further comprising a plurality of segmented flux grooves formed in said clutch plate facing said mainshaft gear.

8. The transmission shift system of claim 4, further comprising a plurality of flux grooves formed in said mainshaft gear facing said clutch plate.

* * * * *